US008209418B2

(12) United States Patent
Xu

(10) Patent No.: US 8,209,418 B2
(45) Date of Patent: Jun. 26, 2012

(54) METHOD FOR DISPLAYING SITE INFORMATION IN A VIDEOCONFERENCING SYSTEM

(75) Inventor: Fugang Xu, Guangdong (CN)

(73) Assignee: Huwei Technologies Co., Ltd., Shenzhen (CN)

( * ) Notice: Subject to any disclaimer, the term of this patent is extended or adjusted under 35 U.S.C. 154(b) by 1076 days.

(21) Appl. No.: 11/456,994

(22) Filed: Jul. 12, 2006

(65) Prior Publication Data

US 2007/0011313 A1 Jan. 11, 2007

Related U.S. Application Data

(63) Continuation of application No. PCT/CN2005/000067, filed on Jan. 17, 2005.

(30) Foreign Application Priority Data

Jan. 16, 2004 (CN) .......................... 2004 1 0002611

(51) Int. Cl.
*G06F 15/16* (2006.01)

(52) U.S. Cl. .......................... 709/227; 709/204; 709/205

(58) Field of Classification Search .................. 709/227, 709/204–205; 348/14
See application file for complete search history.

(56) References Cited

U.S. PATENT DOCUMENTS

| 5,815,080 | A | | 9/1998 | Taguchi |
| 5,886,734 | A | * | 3/1999 | Ozone et al. ............... 348/14.09 |
| 6,128,649 | A | * | 10/2000 | Smith et al. .................. 709/217 |
| 6,466,252 | B1 | | 10/2002 | Miyazaki |
| 6,549,178 | B2 | | 4/2003 | Yasuda |
| 6,624,841 | B1 | * | 9/2003 | Buchner et al. .............. 348/14.1 |
| 6,831,675 | B2 | * | 12/2004 | Shachar et al. ............ 348/14.08 |
| 2001/0040532 | A1 | | 11/2001 | Yasuda |
| 2002/0038293 | A1 | * | 3/2002 | Seiden ........................... 705/80 |
| 2004/0117247 | A1 | * | 6/2004 | Agrawal et al. ................. 705/14 |
| 2005/0146606 | A1 | * | 7/2005 | Karsenty et al. .............. 348/143 |
| 2006/0129812 | A1 | * | 6/2006 | Mody ........................... 713/168 |

FOREIGN PATENT DOCUMENTS

| CN | 1404311 | | 3/2003 |
| CN | 1457198 | A | 11/2003 |
| CN | 1463157 | A | 12/2003 |
| CN | 1464750 | | 12/2003 |
| CN | 1642263 | A | 7/2005 |
| CN | 100484230 | C | 4/2009 |
| JP | 04290361 | A | 10/1992 |
| JP | 7-284076 | A | 10/1995 |

(Continued)

OTHER PUBLICATIONS

European Office Action for European Application No. 05700441.8, dated Jul. 17, 2008.

(Continued)

*Primary Examiner* — Minh-Chau Nguyen

(57) ABSTRACT

The present invention discloses a method for displaying site information in a videoconferencing system. According to the method, a control equipment acquires status information of sites in the course of a videoconference, and acquires information of un-enrolled sites according to the acquired status information of the sites. The control equipment sends the obtained information of the un-enrolled sites to a terminal periodically or on receiving a request from the terminal. After receiving the information of the un-enrolled sites, the terminal displays the information of the un-enrolled sites on a screen; thereby the user can examine and perform further control operations conveniently.

14 Claims, 6 Drawing Sheets

FOREIGN PATENT DOCUMENTS

| | | |
|---|---|---|
| JP | 07264567 A | 10/1995 |
| JP | 8-6757 A | 1/1996 |
| JP | 8-18937 A | 1/1996 |
| JP | 08079390 A | 3/1996 |
| WO | 98/56177 | 12/1998 |

OTHER PUBLICATIONS

Notice of Reasons for Rejection for Japanese Application No. 2006-548083, dated Jul. 3, 2009, and English translation thereof.

Chinese Office Action for Chinese Patent Application No. 200710176288.8, dated Feb. 15, 2008, and English translation thereof.

Chinese Office Action for Chinese Patent Application No. 200710176288.8, dated Aug. 8, 2008, and English translation thereof.

Japanese Office Action for Japanese Patent Application No. 2006-548083, dated Mar. 19, 2010, and English translation thereof.

English translation of Written Opinion of the International Searching Authority for International Application No. PCT/CN2005/000067, dated Apr. 28, 2005.

Summons to Attend Oral Proceedings for European Patent Application No. 05700441.8, dated May 31, 2011.

Request for Invalidation of Patent Right of Chinese Application No. 200410002611.6, dated Sep. 23, 2011, and partial English translation thereof.

Notification of Examination on Request for Invalidation for Chinese Patent Application No. 200410002611.6, dated Dec. 9, 2011, and English translation thereof.

\* cited by examiner

METHOD FOR DISPLAYING SITE INFORMATION IN A VIDEOCONFERENCING SYSTEM

CROSS-REFERENCE TO RELATED APPLICATIONS

This application is a continuation of International Application No. PCT/CN2005/000067 filed Jan. 17, 2005. This application claims the benefit of Chinese patent application no. CN200410002611.6 filed Jan. 16, 2004. The disclosures of the above applications are incorporated herein by reference.

FIELD

The present disclosure relates to videoconference technologies, and particularly to a method for displaying site information in a videoconferencing system.

BACKGROUND

The statements in this section merely provide background information related to the present disclosure and may not constitute prior art.

Along with the enhancement of modern management and the conception of temporal efficiency, people at different places expect to have both video and audio communications with each other. As a result, videoconferencing systems emerged and have been developing gradually. The videoconferencing system, which is based upon color video camera techniques, optical communication technologies, multimedia computer control technologies, single-chip control technologies, large-scale video matrix switching technologies as well as audio conference technologies, implements interaction and exchange of video and audio information between two or more individuals located at physically distinct locations. The videoconferencing system improves the quality of conference, saves the expense and enhances the efficiency of conference.

A videoconferencing system commonly consists of a main site and multiple sub-sites. In each site there is a terminal and all the terminals for the conference are controlled by a multipoint control unit (MCU), and are connected by satellite networks or computer networks. The main site is the control center of a videoconferencing system. The console used as the primary control equipment as well as the image and voice assigning or switching equipment are all deployed in the main site. To control the process of videoconference effectively, the console of the main site needs to know which of the sub-sites has enrolled. Generally speaking, a connection problem, a failure of the terminal, inappropriately configured parameters, quit of the sites or switch-off of the terminal may all lead to the un-enrollment of a sub-site. The un-enrolled site, which occupies the port resources, will have an impact on the proper process of the videoconference. If the videoconferencing system is an operating system leased by the client, it will further affect the accounting operation.

However, in the existing videoconferencing systems, the H.230, H.243, H.323 or H.245 protocols are generally used to control the conference. During the process of controlling the conference with these protocols, only the list of the enrolled sites can be transmitted among the terminals of the sub-sites, the MCU and the console of the main site. The operator of the console in the main site can only handle the enrolled sites. As the list of the un-enrolled sites is not provided, the user is unable to get this information about the un-enrolled sites. The user has to contact the console to know which site has not enrolled, and for this purpose, the user has to call the console by itself, which wastes the time of the user and affects the efficiency of the whole videoconferencing system. After getting the list of the un-enrolled sites, the user has to record the information about the list, which is inconvenient for the user, especially when the number of the un-enrolled sites is large. Besides, the user can't handle the un-enrolled sites via the terminal directly, but only handle the un-enrolled sites via the console, which affects the flexibility and the convenience in controlling the whole videoconferencing system.

SUMMARY

In view of the above, the present invention provides a method for displaying the site information in a videoconferencing system, so that the user can directly get the information about the un-enrolled sites.

The specific technical solution of the present invention is as follows:

A method for displaying site information in a videoconference system, wherein the videoconference system comprises a control equipment and terminals, comprises:

the control equipment acquiring status information of sites in the course of a videoconference;

the control equipment acquiring information of un-enrolled sites according to the acquired status information of the sites;

the control equipment sending the acquired information of the un-enrolled sites to the terminals; and the terminals displaying the information of the un-enrolled site on screens.

Wherein, the control equipment is a console, and the step of the control equipment acquiring the status information of the sites comprises:

the console receiving the status information of the sites from a Multipoint Control Unit (MCU); and the step of the control equipment sending the acquired information of the un-enrolled sites to the terminals comprises:

the console sending the information of the un-enrolled sites to the MCU;

the MCU forwarding the information of the un-enrolled sites received from the console to the terminals.

Wherein, in the course of a concatenated conference, the step of the console receiving the status information of the sites from the MCU comprises:

the console receiving the status information of the sites from all the MCUs; and the step of the control equipment acquiring the information of the un-enrolled sites comprises:

the console collecting from every MCU the information of the un-enrolled sites and acquiring the information of all the un-enrolled sites.

Wherein, the control equipment is an MCU, and the step of the control equipment acquiring the status information of the sites comprises:

the MCU acquiring the status information of the sites directly by calling the sites; and the step of the control equipment sending the acquired information of the un-enrolled sites to the terminals comprises:

the MCU sending the information of the un-enrolled sites to the terminals.

In the course of a cascading conference, the method further comprises:

each MCU sending its self-acquired information of the un-enrolled sites to other MCUs, and saving and collecting the information of the un-enrolled sites from other MCUs.

After the step of the terminals displaying the information of the un-enrolled sites on the screen, the method further comprises:

handling the un-enrolled sites according to the displayed information of the un-enrolled sites.

The method further comprises:

the MCU sending to the terminals instructions of adding or deleting the sites to synchronize the information of the un-enrolled sites between the MCU and the terminals.

Wherein, the step of the control equipment sending the acquired information of the un-enrolled sites to the terminals comprises:

sending the acquired information periodically or on receiving requests from the terminals.

In the process of a videoconference, the control equipment such as the console or the MCU will acquire the status information of the sites, and then acquire the information about the un-enrolled sites according to the status information of the sites. The control equipment sends the information of the un-enrolled sites to the terminals periodically or on receiving requests from the terminals. The terminal displays the information of the un-enrolled sites on the screen. In this way, the user can conveniently get the information of all un-enrolled sites via the terminal, and can know definitely about the un-enrolled sites. The user doesn't have to call the console by himself or make additional records. Therefore, the method brings convenience to the user, as well as the efficiency to the videoconferencing system.

Further, the terminal can display the information about all the sites without enrollment on the screen. Via the terminal, the user can adopt further control operations e.g. deleting the un-enrolled sites to release the port resource occupied, or calling the un-enrolled sites without failure enrollment to enroll the conference again. In this way, the user can control the process of videoconference via the terminal more effectively, and the convenience and flexibility of controlling the whole videoconferencing system is enhanced. Thereby, the application and the development of videoconferencing system are promoted.

In addition, the present invention can also properly support a cascading conference, i.e. a conference convened simultaneously with multiple MCUs. In a cascading conference, if the console generates the information of the un-enrolled sites, the console can receive the status information of each videoconference from the according MCU, then acquire the information of the un-enrolled sites from each MCU, and in turn, acquire the information of all the un-enrolled sites of the entire conference. If the MCU generates the information of the un-enrolled sites, each MCU sends its information of the un-enrolled sites to other MCUs and receives the information of the un-enrolled sites from other MCUs, thus the complete information of un-enrolled sites of the entire conference is collected. Furthermore, each MCU will send the latest information to the console or other MCUs whenever there is any change in the information of the un-enrolled sites of the MCU. Thus the correctness of the information of the un-enrolled sites is guaranteed.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
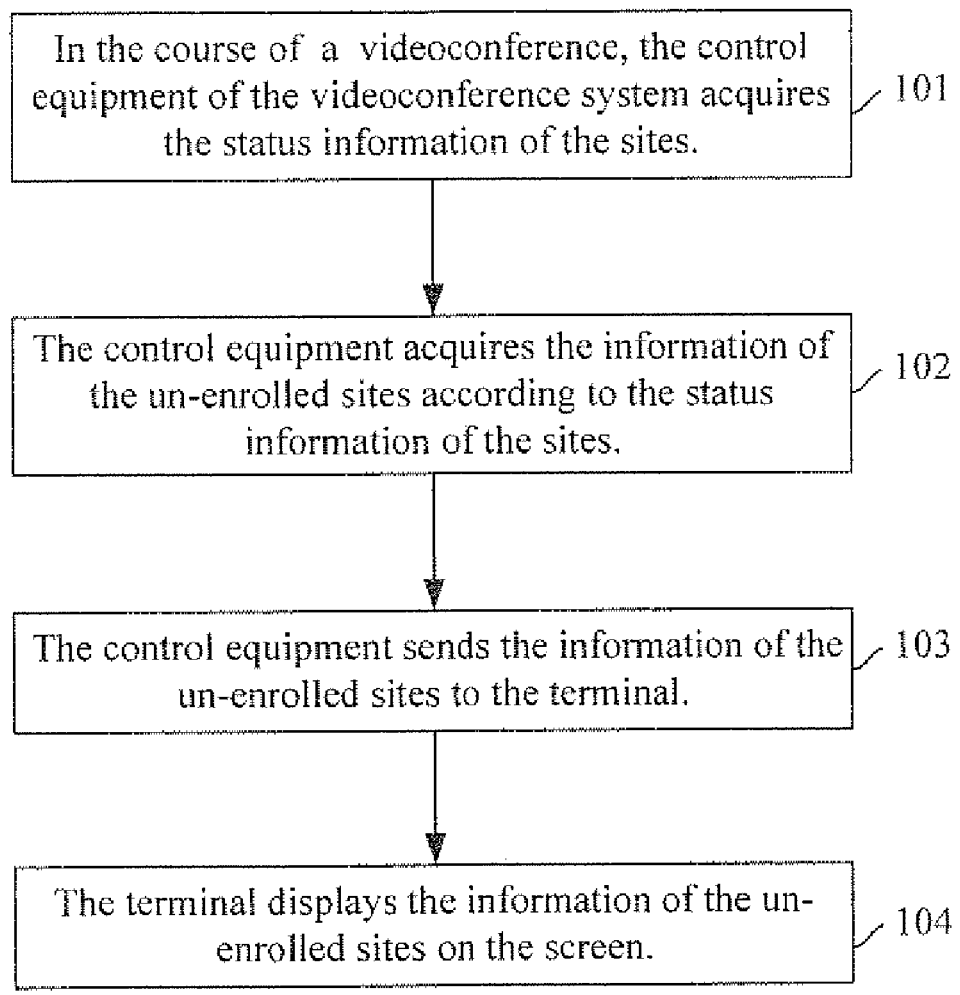
FIG. 1 is a general flow chart in accordance with an embodiment of the present invention.

The following description is merely exemplary in nature and is not intended to limit the present disclosure, application, or uses. It should be understood that throughout the drawings, corresponding reference numerals indicate like or corresponding parts and features.

The present invention is hereinafter explained in detail with reference to the accompanying figures and embodiments.

In accordance with an embodiment of the present invention, the existing terminal, MCU, and console as well as the protocol for information interaction between them need to be modified, so that the terminal is able to acquire and display the information of the un-enrolled sites. Specifically speaking, the terminal should further involve the function of acquiring and displaying the information about the un-enrolled sites, and the function of controlling the un-enrolled sites according to the instruction of the user; the MCU should further involve the function of generating the information of the un-enrolled sites or the function of requesting the information of the un-enrolled sites from the console, and the function of sending the information of the un-enrolled sites to the terminal; the console should further involve the function of generating the information of the un-enrolled sites and sending it to MCUs. Obviously, as described hereinafter, if it is the MCU that generates the information about the un-enrolled sites directly, the console does not need to be modified.

After modifying the terminal, the MCU and the console, as shown in FIG. 1, the method for displaying the site information in the videoconferencing system according to an embodiment of the present invention comprises the steps of:

Step 101: a videoconference is made in the videoconferencing system, and the control equipment of videoconferencing system acquires the status information of the site. Wherein, the videoconference is made in the conventional mode via the console or the terminal, or in the mode via booking through the WEB. The control equipment herein may be the MCU or the console, which is to be described in detail later.

Step 102: the control equipment of the videoconferencing system gets the information of the un-enrolled site according to the status information of the site.

Step 103: the control equipment sends the information of the un-enrolled site to the terminal. In the embodiment, the information of the un-enrolled site can be sent to the terminal in the form of the list of the un-enrolled site.

Step 104: the terminal displays the information of the un-enrolled site on the screen.

Figure 2:
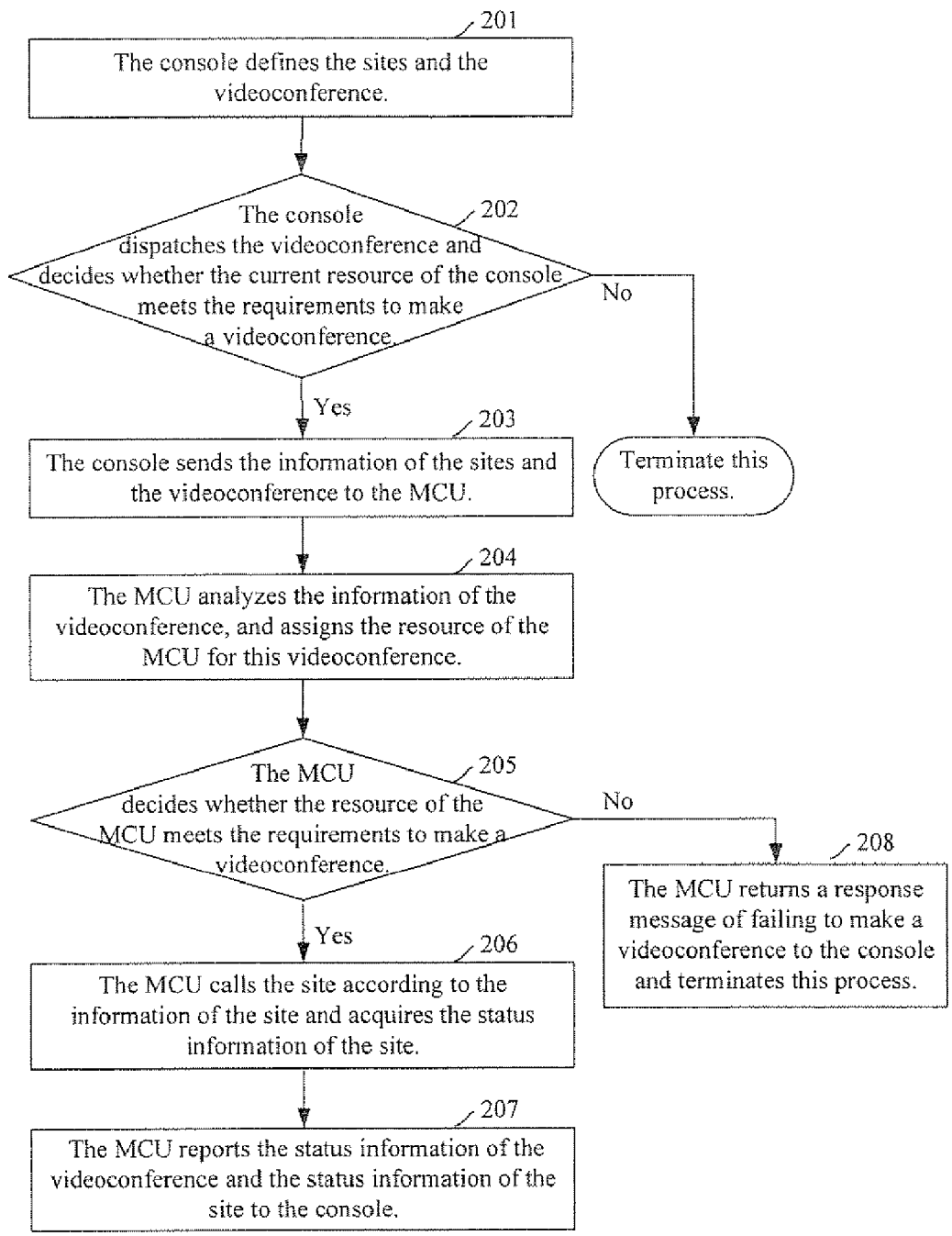
FIG. 2 is a flow chart for making a videoconference via the console.

As described in step 101, the videoconference can be made via the console. The specific handling process is shown in FIG. 2.

In step 201, the console defines the site and the videoconference.

In step 202, the console dispatches the videoconference and decides whether the current resource of the console meets the requirements to make a videoconference. If the current resource of the console meets the requirements to make a videoconference, the console proceeds to step 203; otherwise the console terminates this process.

In step 203, the console sends the information of the site and the videoconference to the MCU. The information of the videoconference includes the name of the videoconference and the parameters of the videoconference. The information of the site includes the name of the site, the type of the site and the video protocol adopted by the site.

In step 204, the MCU analyzes the information of the videoconference, and assigns the resource of the MCU for this videoconference.

In step 205, the MCU decides whether the resource of the MCU meets the requirements to make a videoconference. If the resource of the MCU meets the requirements to make a videoconference, the MCU proceeds to step 206; otherwise the MCU returns a response message of failing to make a videoconference to the console in step 208, and terminates this process.

In step 206, the MCU calls the site according to the information about the site and acquires the status information of the site. The status information of the site includes the enrolled status of the site, the videoconference that the site belongs to and the current control authority of the site. The status of the site means whether the site has enrolled.

In step 207, the MCU reports the status information of the videoconference and the status information of the site to the console. The status information of the videoconference means the proceeding situation of the videoconference, e.g. whether the videoconference is broadcasted, or whether there is a chairman, etc. The chairman refers to a site that has the control authority, usually the main site.

Figure 3:
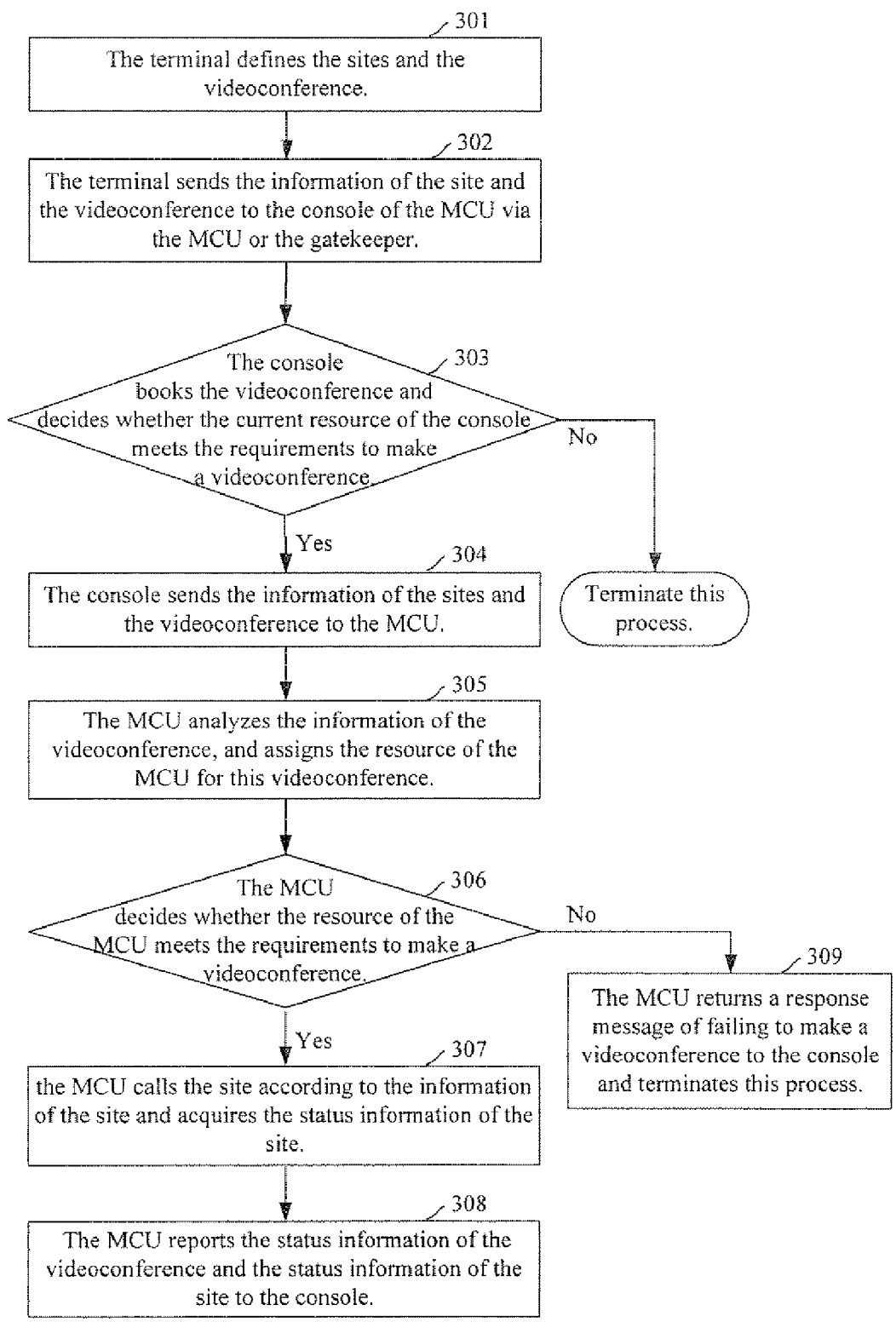
FIG. 3 is a flow chart for making a videoconference via the terminal SiteCall.

As described in step 101, the videoconference can also be made via the terminal SiteCall. The detailed handling process is shown in FIG. 3.

In step 301, the terminal defines the site and the videoconference.

In step 302, the terminal sends the information of the site and the videoconference to the console of the MCU via the MCU or the gatekeeper.

In step 303, the console dispatches the videoconference and decides whether the current resource of the console meets the requirements to make a videoconference. If the current resource of the console meets the requirements to make a videoconference, the console proceeds to step 304; otherwise the console terminates this process.

In step 304, the console sends the information of the videoconference and the site to the MCU.

In step 305, the MCU analyzes the information of the videoconference, and assigns the resource of the MCU for this videoconference.

In step 306, the MCU decides whether the resource of the MCU meets the requirements to make a videoconference. If the resource of the MCU meets the requirements to make a videoconference, the MCU proceeds to step 307; otherwise the MCU returns a response message of failing to make a videoconference to the console in step 309, and terminates this flow.

In step 307, the MCU calls the site according to the information about the site and acquires the status information of the site.

In step 308, the MCU reports the status information of the videoconference and the status information of the site to the console.

Figure 4:
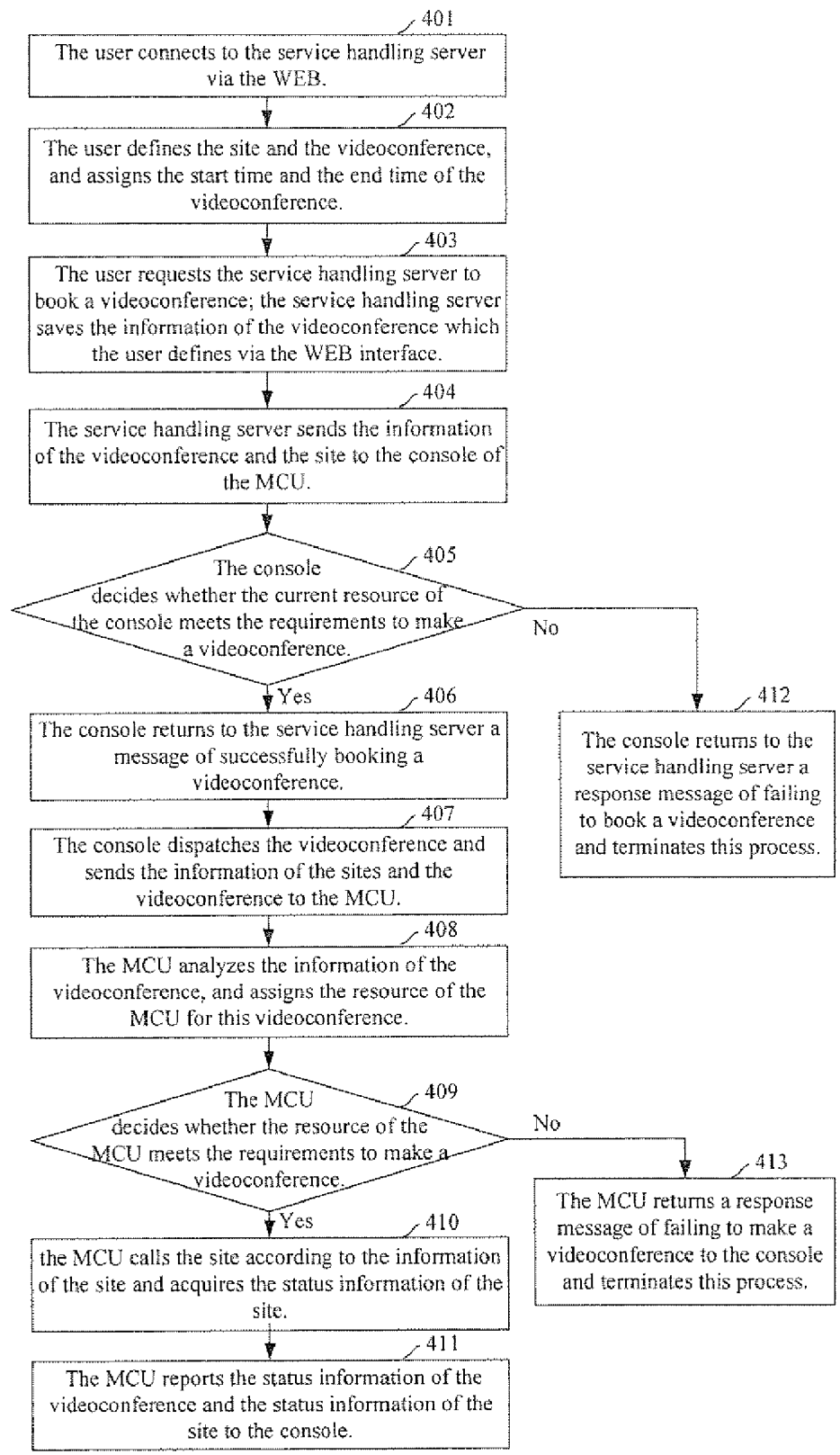
FIG. 4 is a flow chart for making a videoconference by Booking through the WEB.

As described in step 101, the videoconference can also be made by booking through the WEB. The detailed handling process is shown in FIG. 4.

In step 401, the user connects to the service handling server via the Web.

In step 402, the user defines the site and the videoconference, and designates the start time and the end time of the videoconference.

In step 403, the user requests the service handling server to book a videoconference; the service handling server saves the information about the videoconference which the user defines via the WEB interface.

In step 404, the service handling server sends the information of the videoconference and the site to the console of the MCU.

In step 405, the console of the MCU decides whether the current resource of the console meets the requirements to make a videoconference. If the current resource of the console meets the requirements to make a videoconference, the console proceeds to step 406; otherwise the console returns to the service handling server a response message of failing to book a videoconference in step 412 and terminates this process.

In step 406, the console returns to the service handling server a message of successfully booking a videoconference.

In step 407, when the booked time comes, the console dispatches the videoconference, sends the information of the videoconference and the site to the MCU.

In step 408, the MCU analyzes the information of the videoconference, and assigns the resource of the MCU for this videoconference.

In step 409, the MCU decides whether the resource of the MCU meets the requirements to make a videoconference. If the resource of the MCU meets the requirements to make a videoconference, the MCU proceeds to step 410; otherwise the MCU returns a response message of failing to make a videoconference to the console in step 413, and terminates this process.

In step 410, the MCU calls the site according to the information of the site and acquires the status information of the site.

In step 411, the MCU reports the status information of the videoconference and the status information of the site to the console.

In the mode shown in FIG. 3 and FIG. 4, a person specially assigned for watching the console is normally unnecessary. The console needs to be operated only when there is a failure in the system. Compared with the mode shown in FIG. 2, these two modes are simpler and more practical.

After a videoconference is made via any of the three aforementioned approaches, both the MCU and the console will get the status information of the videoconference and the site.

After a videoconference is made successfully, the terminal can request the information of the un-enrolled sites from the MCU to know which sites have not enrolled. The console can further handle the un-enrolled sites, e.g. hang up and call the un-enrolled sites again, etc.

Figure 5:
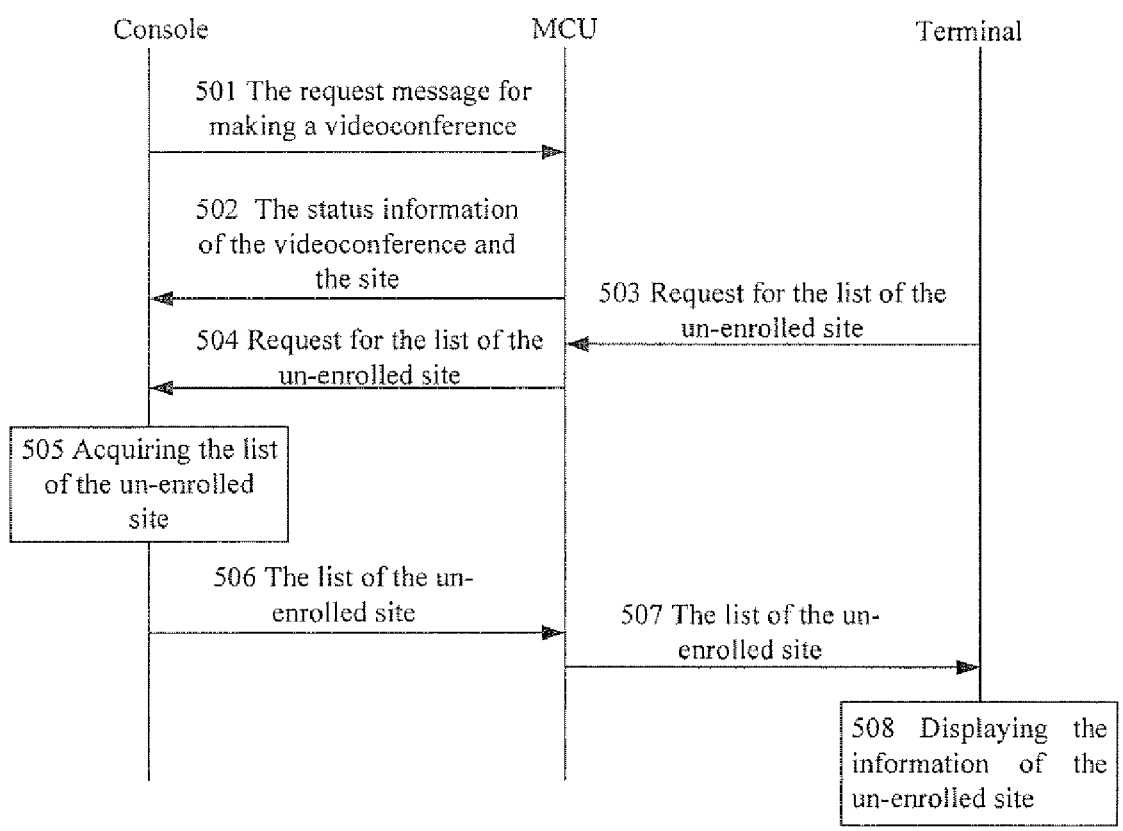
FIG. 5 is a flow chart of the information interaction in accordance with an embodiment of the present invention when the console generates the information of the un-enrolled sites.
Figure 6:
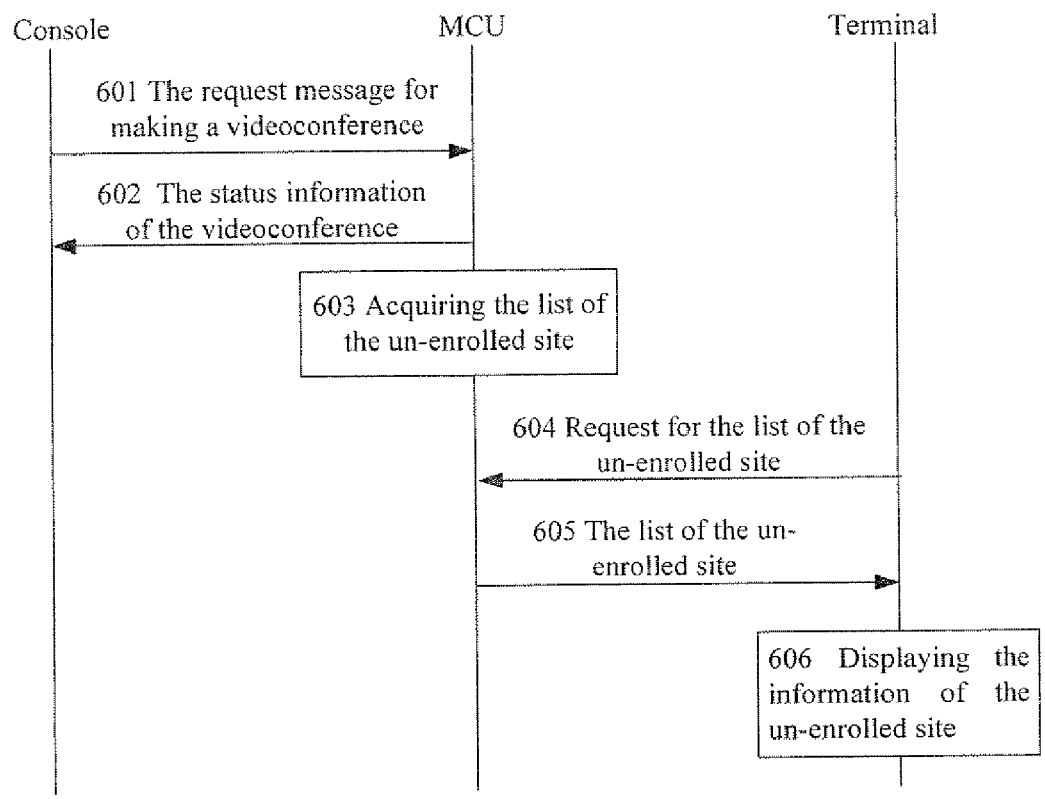
FIG. 6 is a flow chart of the information interaction in accordance with an embodiment of the present invention when the MCU generates the information of the un-enrolled sites.

On receiving the request from the terminal, the MCU can request the console for a list of the un-enrolled sites, as shown in FIG. 5; or generates a list of the un-enrolled sites directly, as shown in FIG. 6. The two ways are hereinafter explained respectively.

FIG. 5 shows the flow chart of the information interaction in accordance with the embodiment of the present invention when the MCU requests the console for a list of the un-enrolled sites. It is assumed herein that a videoconference is made via a console. It is understood, however, that the other mode to make a videoconference are applicable without any difficulty in the undermentioned process.

In step 501, the console sends to the MCU a request message for making a videoconference.

In step 502, the MCU gets the status information of the videoconference and the site, and sends the information to the console.

In step 503, the terminal sends to the MCU a request message for the information about the un-enrolled sites.

In step 504, after receiving the request message, the MCU forwards the request message to the console.

In step 505, the console acquires the information about the un-enrolled site according to the self-saved status information of the site of current videoconference. Specifically, the console acquires the information about the un-enrolled sites according to the information of all the sites and the enrolled sites. For instance, the console creates a list with the information of all the sites, and creates another list with the information of the enrolled sites; then the console compares these two lists, for example subtracts the latter list from the former list, and acquires the list of the un-enrolled sites as the information about the un-enrolled sites.

In step 506, the console sends the acquired list of the un-enrolled sites to the MCU that sends the request message.

In step 507, after receiving the list of the un-enrolled sites from the console, the MCU forwards the list to the terminal that sends the request message.

In step 508, the terminal displays the information about the un-enrolled sites on the screen.

Obviously, in step 506, the console can also send the list of the un-enrolled sites to all the MCUs or some predefined MCUs. In step 507, the MCU can also send the list of the un-enrolled sites to all the terminals connecting to it.

In the aforesaid process, according to the practical demands of the videoconference, the MCU may monitor the course of the videoconference and the change of the site in real time, and periodically reports the status information of the videoconference and the sites to the console; the console updates the list of the un-enrolled sites whenever necessary according to the reported information, and sends the list of the un-enrolled sites to the MCU periodically; then the MCU forwards the list of the un-enrolled sites to all the terminals.

In addition, the MCU can also acquire the information of the un-enrolled sites by itself, other than requesting the console for this information. FIG. 6 shows such a case, in which it is also assumed that the videoconference is made via a console.

In step 601, the console sends to the MCU the request message for making a videoconference.

In step 602, the MCU acquires the status information of the videoconference and the site, and reports the status information of the videoconference to the console. It is different herein from the embodiment shown in FIG. 5 that the MCU doesn't report the status information of the site to the console.

In step 603, the MCU acquires the list of the un-enrolled sites according to the status information of the sites. The MCU acquires the information about the un-enrolled sites according to the information about all the sites and the enrolled sites.

In step 604, in the course of the videoconference, the terminal sends to the MCU a request for the information of the un-enrolled sites.

In step 605, after receiving the request for the information of the un-enrolled sites from the terminal, the MCU acquires the self-saved list of the un-enrolled sites, and sends the obtained list of the un-enrolled sites to the terminal that sends the request message. Similarly, the MCU can also send this list to all the terminals connecting to it, rather than only to the terminal that sends the request message.

In step 606, the terminal displays the information of the un-enrolled sites on the screen.

In addition, in the case shown in FIG. 6, the MCU may save the information of the un-enrolled sites in advance and send the information to the terminal periodically instead of sending the information on a request from the terminal. In the same way, according to the practical demands of the videoconference, the MCU may also monitor the course of the videoconference and the change of the site in real time and periodically update the self-saved list of the un-enrolled sites according to this information, and send the latest list of the un-enrolled sites to the terminal periodically or on a request message from the terminal.

After the above processing, the user can see the information about all the un-enrolled sites on the screen, and have a clearer understanding of all the information of the sites.

Furthermore, after acquiring the list of the un-enrolled sites, the terminal can handle these sites, for example, delete the un-enrolled sites to release the occupied port resource, or call the un-enrolled sites again to make the sites with a failure to enroll again, etc. Obviously, in practice, in terms of the operation authority, the control operation should be executed only by the terminal with corresponding control authorities, for instance by the terminal of the main site, i.e. by the chairman. In this way, the control function of the entire videoconferencing system will be enhanced further, and the application of the videoconferencing system will be convenient.

Any operational command of the terminal of the main site should be sent via signaling to the MCU and executed by the MCU; the MCU returns the result of the operation to the terminal of the main site, indicating whether the operation of the terminal succeeds. The embodiment of the present invention realizes the information update between the MCU and the console, as well as the synchronization between the MCU and the terminal by the MCU sending to the terminal the instruction of adding or deleting a site. For example, in the case of deleting a site, if the site to be deleted is the un-enrolled site, the MCU instructs the terminal to delete the site from the list of the un-enrolled sites; in the case of adding a site, if the site to be added is the un-enrolled site, the MCU instructs the terminal to add the site to the list of the un-enrolled sites; if the site to be added is the enrolled site, the MCU instructs the terminal to add the site to the list of the enrolled sites.

The embodiment of the present invention can also support a cascading videoconference. In a cascading videoconference, there are multiple MCUs, each of which makes a videoconference at the same time. These MCUs are connected via a private line or Internet. The videoconferences on each MCU communicate with each other via the linking line connecting the MCUs, so that the video signals, the audio signals and the control signals of the videoconferences can be transmitted among the videoconferences. In the process of a cascading videoconference, the console respectively dispatches the videoconference in each MCU. Although there is a videoconference on each MCU, there is only one so-made videoconference for the console, and all sites belong to this videoconference. In accordance with the embodiment of the present invention, the console acquires the status information of the site of the videoconference on each MCU, i.e. the status information of the site of the videoconference that the console controls, according to the status information of the site that each MCU manages respectively. The console generates the list of the un-enrolled sites according to the status information of the sites, i.e. collects the information of the un-enrolled sites on each MCU, and acquires the list of all the un-enrolled sites of the entire videoconferences. In this way, whichever terminal of MCU requests the information of the un-enrolled sites, the console will send the list of the un-enrolled sites of the videoconference to the terminal.

The foregoing description shows the case of acquiring the list of the un-enrolled sites via the console. If the MCU generates the list of the un-enrolled sites directly, in the process of a cascading videoconference, the list of the un-enrolled sites of each MCU should be transmitted among the MCUs and be saved in each MCU. In other words, each MCU sends its list of the un-enrolled sites to other MCUs, and saves the list of the un-enrolled sites sent from other MCUs, so as to acquire the list of the un-enrolled sites of all the MCUs. This process is carried on continuously, i.e. the MCU should periodically send its list of the un-enrolled sites to other MCUs and receive the list of the un-enrolled sites from other MCUs, and adjust the entire list of the un-enrolled sites accordingly in real-time, so as to guarantee the consistency of the lists of the un-enrolled sites saved in all the MCUs, and further guarantee that the lists of the un-enrolled sites acquired by the terminals of every MCU are identical. In practice, the MCU can send the list of the un-enrolled sites to corresponding terminals periodically, or send the list on receiving a request from the terminal.

In addition, the embodiment of the present invention can provide the list of the enrolled sites as well as the list of the un-enrolled sites to the terminal at the same time. The user can handle the enrolled sites, so as to have a clearer understanding of the entire conference, and to enhance the application of the embodiment of the present invention.

The foregoing description is only a preferred embodiment of the present invention and is not used for limiting the present invention, and that various other changes, equal substitutions and modifications without departing from the scope and spirit of the present invention are intended to be included within the scope of the present invention.

What is claimed is:

1. A method for displaying site information in a videoconference system, wherein the videoconference system comprises control equipment and terminals, comprising:
    the control equipment acquiring status information of sites in a course of a videoconference from a Multipoint Control Unit (MCU);
    the control equipment acquiring information of un-enrolled sites according to the acquired status information of the sites;
    the control equipment sending the information of the un-enrolled sites to the MCU;
    the MCU forwarding the information of the un-enrolled sites received from the control equipment to the terminals; and
    the terminals displaying the information of the un-enrolled site on screens,
    wherein the un-enrolled sites comprise the sites which do not enroll in the videoconference and each are not in communication with the control equipment.

2. The method according to claim 1, wherein, in the course of a concatenated conference, the step of the control equipment receiving the status information of the sites from the MCU comprises:
    the control equipment receiving the status information of the sites from all the MCUs; and
    the step of the control equipment acquiring the information of the un-enrolled sites comprises:
    the control equipment collecting from every MCU the information of the un-enrolled sites and acquiring the information of all the un-enrolled sites.

3. The method according to claim 2, in the course of a cascading conference, further comprising:
    each MCU sending its self-acquired information of the un-enrolled sites to other MCUs, and saving and collecting the information of the un-enrolled sites from other MCUs.

4. The method according to claim 3, wherein, the status information of the sites at least comprises the enrolled status of the sites.

5. The method according to claim 4, wherein, the step of handling the un-enrolled sites comprises:
    deleting the un-enrolled sites or calling the un-enrolled sites again.

6. The method according to claim 3, wherein, the information of all the sites, the information of all the enrolled sites and the information of all the un-enrolled sites are created and saved in the form of a list, and the control equipment sending the acquired information of the un-enrolled sites to the terminals comprises:
    the control equipment sending the list of the un-enrolled sites to the terminals.

7. The method according to claim 2, further comprising:
    the MCU sending to the terminals instructions of adding or deleting the sites to synchronize the information of the un-enrolled sites between the MCU and the terminals.

8. The method according to claim 1, wherein, the control equipment is an MCU, and the step of the control equipment acquiring the status information of the sites comprises:
    the MCU acquiring the status information of the sites directly by calling the sites; and
    the step of the control equipment sending the acquired information of the un-enrolled sites to the terminals comprises:
    the MCU sending the information of the un-enrolled sites to the terminals.

9. The method according to claim 1, wherein, the step of the control equipment acquiring the information of the un-enrolled sites according to the acquired status information of the sites comprises:
    the control equipment acquiring the information of all the sites;
    the control equipment acquiring the information of all enrolled sites according to the status information of the sites; and
    the control equipment acquiring the information of the un-enrolled sites by comparing the information of all the sites with the information of all the enrolled sites.

10. The method according to claim 1, after the step of the terminals displaying the information of the un-enrolled sites on the screen, further comprising:

handling the un-enrolled sites according to the displayed information of the un-enrolled sites.

11. The method according to claim 1, before the step of the control equipment acquiring the status information of the sites in the process of the videoconference, further comprising:
    making a videoconference via any one of:
    a console, a terminal and a WEB booking.

12. The method according to claim 1, further comprising:
    the MCU sending to the terminals instructions of adding or deleting the sites to synchronize the information of the un-enrolled sites between the MCU and the terminals.

13. The method according to claim 1, wherein, the step of the control equipment sending the acquired information of the un-enrolled sites to the terminals comprises:
    sending the acquired information periodically or on receiving requests from the terminals.

14. The method according to claim 1, further comprising:
    the control equipment creating the information of the enrolled sites and sending the information of the enrolled sites to the terminals;
    the terminals displaying the information of the enrolled sites.

* * * * *

UNITED STATES PATENT AND TRADEMARK OFFICE
CERTIFICATE OF CORRECTION

| | | |
|---|---|---|
| PATENT NO. | : 8,209,418 B2 | |
| APPLICATION NO. | : 11/456994 | |
| DATED | : June 26, 2012 | |
| INVENTOR(S) | : Fugang Xu | |

It is certified that error appears in the above-identified patent and that said Letters Patent is hereby corrected as shown below:

In the Title Page:

Item (73), Assignee: "Huwei Technologies Co., Ltd." should be --Huawei Technologies Co., Ltd.--.

Signed and Sealed this
Twenty-first Day of August, 2012

David J. Kappos
*Director of the United States Patent and Trademark Office*